(12) United States Patent
Varnoux et al.

(10) Patent No.: US 10,001,172 B2
(45) Date of Patent: Jun. 19, 2018

(54) BEARING HAVING A CAGE PROVIDED WITH A WIRE AND A SEAL

(71) Applicants: Laurent Varnoux, Saint Avertin (FR); Frank Berens, Saunay (FR); Bruno Constant, Tours (FR); Olivier Verbe, Tours (FR)

(72) Inventors: Laurent Varnoux, Saint Avertin (FR); Frank Berens, Saunay (FR); Bruno Constant, Tours (FR); Olivier Verbe, Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 48 days.

(21) Appl. No.: 15/293,650

(22) Filed: Oct. 14, 2016

(65) Prior Publication Data

US 2017/0108046 A1    Apr. 20, 2017

(30) Foreign Application Priority Data

Oct. 16, 2015 (FR) .................................. 15 59878

(51) Int. Cl.
| | |
|---|---|
| F16C 33/78 | (2006.01) |
| F16C 33/38 | (2006.01) |
| F16C 19/06 | (2006.01) |
| F16C 33/42 | (2006.01) |

(52) U.S. Cl.
CPC .......... *F16C 33/7893* (2013.01); *F16C 19/06* (2013.01); *F16C 33/3831* (2013.01); *F16C 33/42* (2013.01); *F16C 33/7823* (2013.01); *F16C 2226/12* (2013.01); *F16C 2226/74* (2013.01)

(58) Field of Classification Search
CPC .. F16C 33/3831; F16C 33/42; F16C 33/4611; F16C 33/54; F16C 33/7806; F16C 33/7823; F16C 33/783; F16C 33/7893
See application file for complete search history.

(56) References Cited

U.S. PATENT DOCUMENTS

2010/0308594 A1* 12/2010 Numajiri ................. F16C 19/38
384/470

FOREIGN PATENT DOCUMENTS

| | | | |
|---|---|---|---|
| AT | 382217 B | 1/1987 | |
| DE | -102006036006 A1 * | 2/2008 | .......... F16C 33/4617 |
| DE | 102009025516 A1 | 12/2010 | |
| EP | 2886895 A2 | 6/2015 | |
| FR | 3006398 A1 * | 12/2014 | .......... F16C 33/7806 |
| JP | 2013092241 A | 5/2013 | |
| WO | WO-2016096428 A1 * | 6/2016 | .......... F16C 33/7893 |
| WO | WO-2016096430 A1 * | 6/2016 | .......... F16C 33/7893 |

* cited by examiner

*Primary Examiner* — James Pilkington
(74) *Attorney, Agent, or Firm* — Bryan Peckjian; SKF USA Inc. Patent Dept.

(57) ABSTRACT

The bearing provides an inner race, an outer race, at least one row of rolling elements, and at least one cage for spacing apart the row of rolling elements. The bearing further provides at least one seal that includes means for hooking which are configured to permit the retention of the seal on the cage in at least two predetermined axial hooking positions relative to the outer and inner races.

10 Claims, 4 Drawing Sheets

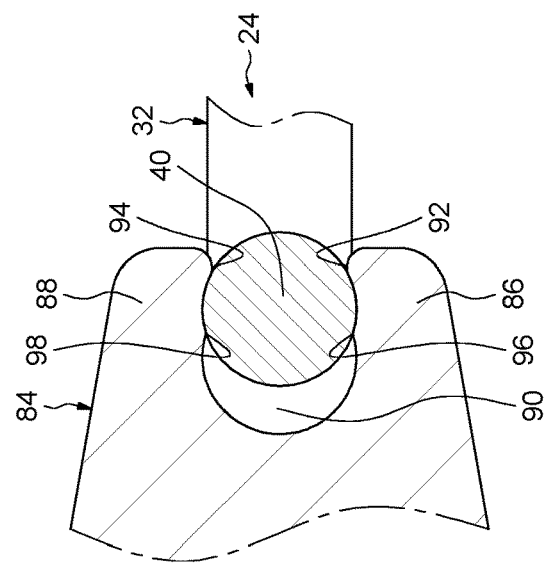
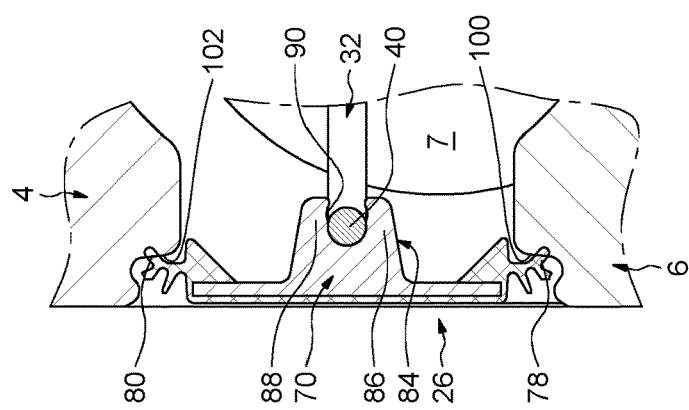
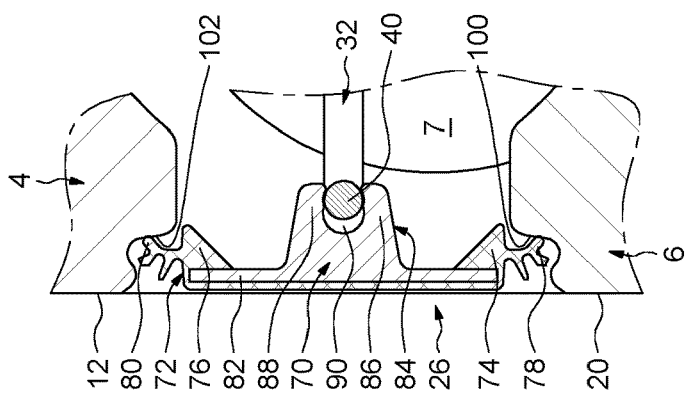

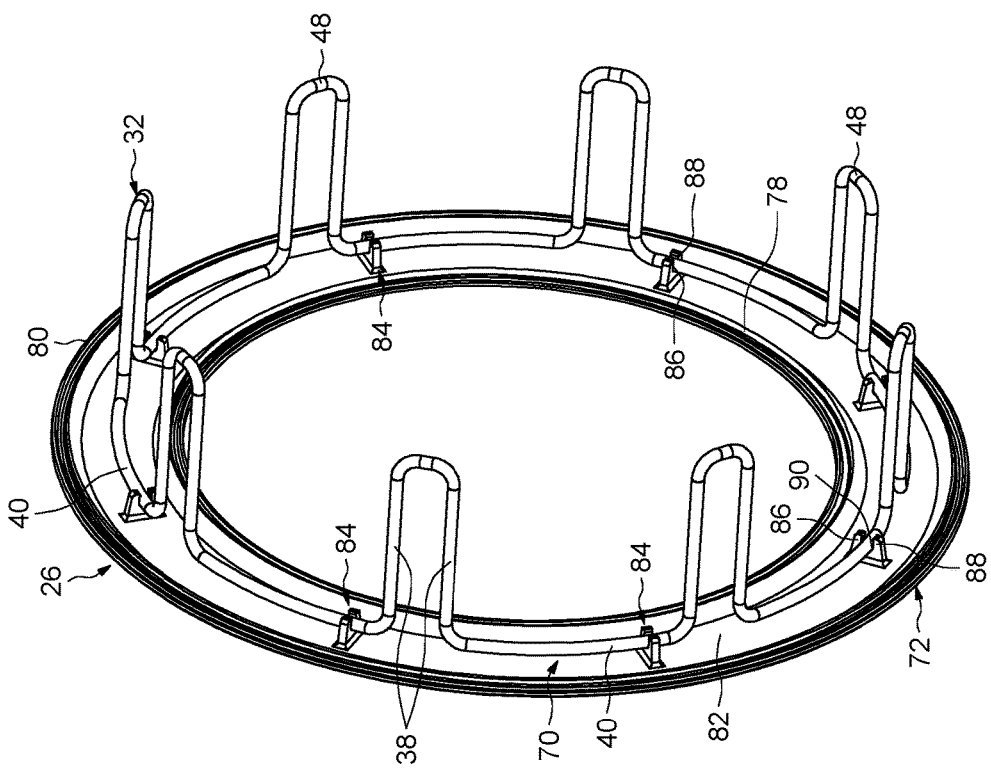

BEARING HAVING A CAGE PROVIDED WITH A WIRE AND A SEAL

CROSS REFERENCE TO RELATED APPLICATIONS

This application claims priority to French patent application no. 1559878 filed on Oct. 16, 2015, the contents of which are fully incorporated herein by reference.

FIELD OF THE INVENTION

The invention relates to the field of bearings provided with seals.

BACKGROUND OF THE INVENTION

Bearings may be used in multiple fields of application in order to provide a mechanical connection of the "ball joint" type or "pivot" type between two parts. Such bearings generally provide an inner race and an outer race defining a bearing space, one or more rows of rolling elements, for example balls or rollers, being arranged therein. The rolling elements are generally held spaced apart circumferentially by a cage. The cage may be produced by molding a synthetic material.

In order to improve the quality of the bearing and, in particular, to reduce friction, it is possible to provide that the dimensions of the cage are reduced. For example, it is possible to provide a cage comprising a wire. In the majority of bearings, two seals are further provided, permitting the leakage of a lubricant introduced into the bearing space to be prevented. The seals also aim to prevent the introduction of external particles, such as dust, inside the bearing space.

A problem frequently encountered during the assembly of the bearing is the fixing of each seal.

The invention aims to provide a bearing equipped with at least one seal which is able to be fitted in a simple and reliable manner, whilst guaranteeing a good seal.

The invention further aims to provide a bearing provided with at least one seal and in which the effectiveness of the sealing of this seal may be modified.

SUMMARY OF THE INVENTION

In one embodiment, the bearing comprises an inner race, an outer race, at least one row of rolling elements and at least one cage for spacing apart the row of rolling elements.

The bearing further provides at least one seal comprising means for hooking which are configured so as to permit the retention of the seal on the cage in at least two predetermined axial hooking positions relative to the outer and inner races.

Advantageously, the means for hooking of the seal are configured to permit the passage from an axial hooking position to a further axial hooking position by the axial sliding of the seal on the cage.

Preferably, each means for hooking of the seal provides a notch, which is open axially at the side of the cage, and at least first and second protuberances radially extending inside the notch so as to ensure the retention of the seal in the two predetermined axial hooking positions. Each means for hooking may provide two flexible tongues delimiting the notch, each of the tongues comprising at least one first and one second protuberance respectively opposite the first and the second protuberance of the other tongue.

In one embodiment, the means for hooking of the seal ensure the retention of the seal on a wire of the cage.

Preferably, the seal is entirely housed inside a bearing space delimited by the outer and inner races in the predetermined axial hooking positions. Thus, the overall space requirement of the bearing is not changed by the presence of the seal. As a variant, it is possible to provide a seal which is fixed to the cage and which cooperates with the front surfaces of the inner and outer races. However, such a solution changes the overall space requirement of the bearing.

In one embodiment, the inner race provides at least one groove formed on an outer surface of the race and the outer race provides at least one groove formed in the bore of the race. The seal may provide at least one external sealing lip and at least one internal sealing lip respectively cooperating with the groove of the outer race and the inner race. According to one advantageous arrangement, the external and internal sealing lips are axially mounted so as to bear against the grooves of the inner and outer races in the predetermined axial hooking positions.

In one embodiment, the seal provides an insert produced in a rigid material and a gasket produced in a flexible material, the insert comprising the means for hooking. Preferably, the gasket of the seal provides external and internal sealing lips.

According to one embodiment, the wire of the cage provides at least one group of heel-like portions spaced apart relative to one another in the circumferential direction and forming a discontinuous ring, the means for hooking the seal being fixed to at least one of the heel-like portions of the group of heel-like portions.

In one embodiment, the wire of the cage provides a first group of heel-like portions spaced apart from one another in the circumferential direction and forming a first discontinuous ring, a second group of heel-like portions spaced apart from one another in the circumferential direction and forming a second discontinuous ring and a plurality of connecting portions each extending between one of the heel-like portions of the first group and one of the heel-like portions of the second group. The connecting portions and the heel-like portions of the first group and/or the heel-like portions of the second group delimit a plurality of spaces, each comprising a rolling element. The cage further provides at least one insert arranged inside each space and provided with a body for the housing of the rolling element contained in the space, the body being hooked to at least one of the connecting portions and/or to the heel-like portion of the wire delimiting the space. It is thus possible, for example, to provide a first seal comprising means for hooking for fixing to at least one of the heel-like portions of the first group and a second seal comprising means for hooking for fixing to at least one of the heel-like portions of the second group.

BRIEF DESCRIPTION OF THE SEVERAL VIEWS OF THE DRAWING

The present invention will be understood more clearly by studying the detailed description of an embodiment, taken by way of non-limiting example and illustrated by the accompanying drawings, in which:

FIGS. 3 and 4 are partial views in section of the bearing of FIGS. 1 and 2, FIG. 5 is a detailed view of FIG. 3, and FIG. 6 is a perspective view of one of the seals and of the cage of the bearing of FIGS. 1 to 4.

DETAILED DESCRIPTION OF THE INVENTION

Figure 1:
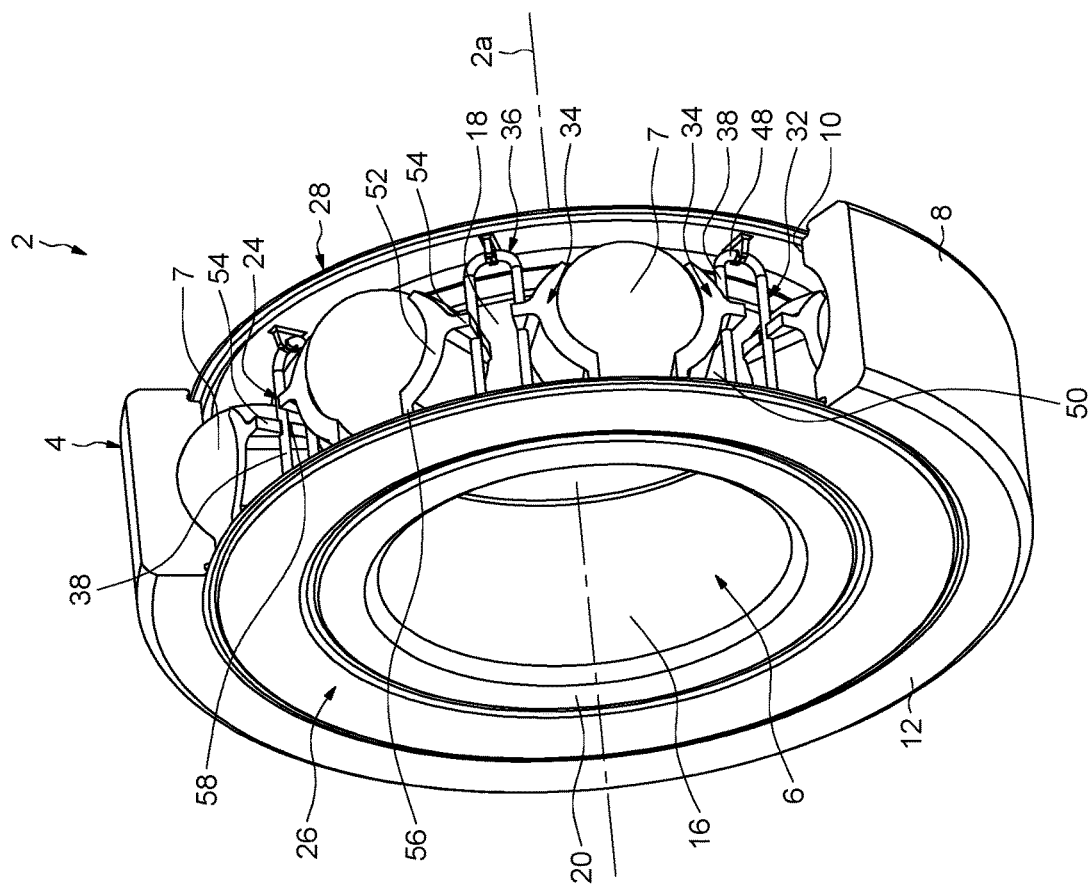
FIGS. 1 and 2 are perspective views of a bearing according to an exemplary embodiment of the invention.
Figure 2:
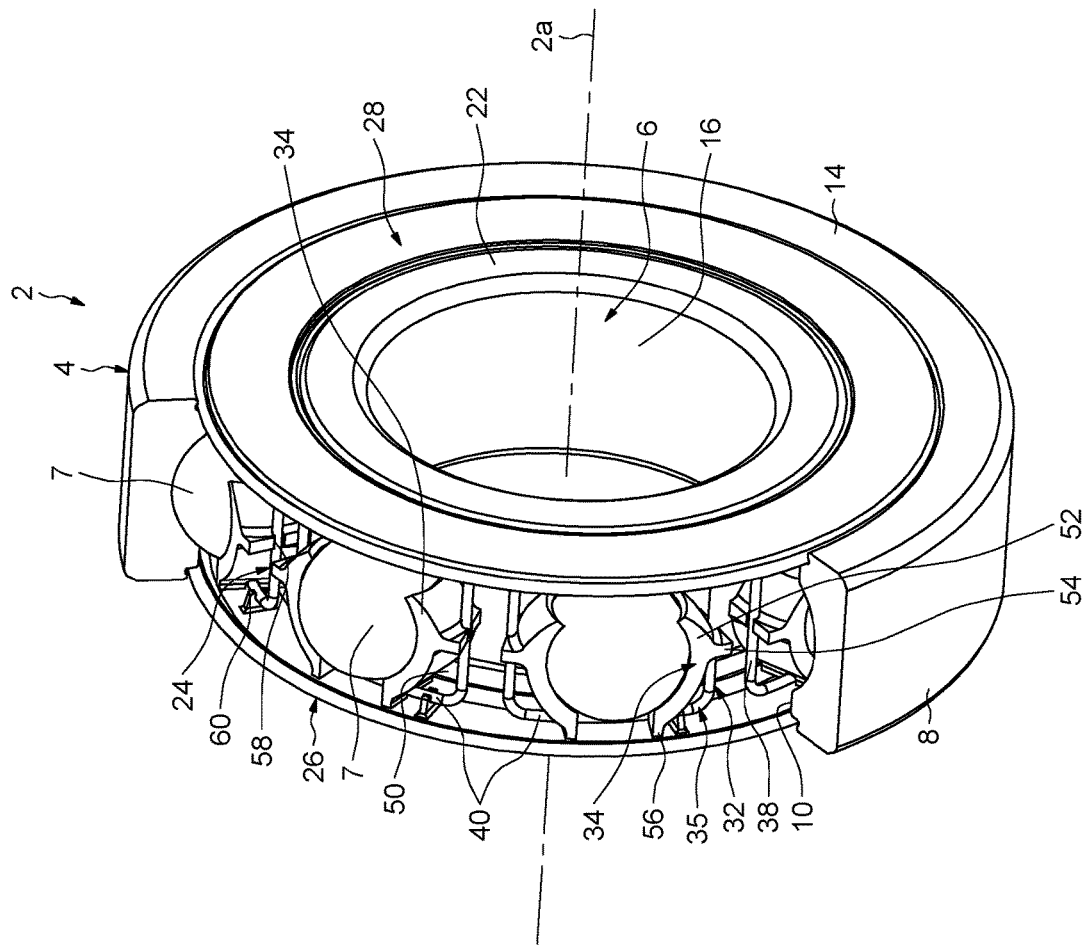

With reference to FIGS. 1 and 2, the bearing, referenced 2 in its entirety, having an axis 2a, provides an outer race 4 (partially illustrated), an inner race 6 and a row of rolling elements, in this case balls 7, interposed between the races. The outer race 4 and the inner race 6 are of cylindrical shape and arranged coaxially relative to one another.

The outer race 4 provides a cylindrical outer surface 8, a cylindrical bore 10 located radially opposite the outer surface 8, and two opposing front radial surfaces 12 and 14, axially delimiting the outer surface 8 and the bore 10. Similarly, the inner race 6 provides a cylindrical bore 16, an outer cylindrical surface 18 located radially opposite the bore 16 and two opposing front radial surfaces 20 and 22 which axially delimit the bore 16 and the outer surface 18. Tracks are formed on the outer 4 and inner 6 races to form bearing raceways for the balls 7. In the exemplary embodiment illustrated, the outer 4 and inner 6 races are solid.

A bearing space (not referenced), the balls 7 being housed therein, is radially delimited by the bore 10 of the outer race and the outer surface 18 of the inner face. The bearing space is axially delimited on one side by the front surfaces 12, 20 and on the other side by the front surfaces 14, 22 of the races.

The bearing 2 also provides a cage 24 for maintaining the circumferential spacing of the balls 7 and axially on each side an annular seal 26, 28 removably fixed to the cage, as will be described in more detail below. The seals 26, 28 close the bearing space, the balls 7 and the cage 24 being housed therein.

The cage 24 is used to define a housing for each of the balls 7 and to maintain the balls inside their respective housings. The cage 24 provides a wire 32 and a plurality of inserts 34. The wire 32 is closed. The wire extends inside the bearing space delimited by the outer 4 and inner 6 races. The wire 32 forms a first discontinuous ring 35 (FIG. 2) and a second discontinuous ring 36 (FIG. 1) and a plurality of connecting portions 38 extending between the discontinuous rings 35 and 36. The discontinuous rings 35 and 36 are parallel to one another and extend in a plane radially to the bearing. The connecting portions 38 extend axially. Due to the sinuous shape of the wire 32, a plurality of spaces 50 containing the balls 7 is defined. The balls 7 are held spaced apart from one another by inserts 34. There is no contact between the wire 32 of the cage and the balls 7. The contact between the balls 7 and the cage 24 is exclusively made by means of the inserts 34. This permits the friction due to the sliding of the balls against the cage to be minimized by an appropriate choice of the material and the shape of the inserts.

The first discontinuous ring 35 consists of a first group of heel-like portions 40 (FIG. 2). The first group of heel-like portions provides as many heel-like portions 40 as the row of balls provides balls 7. The heel-like portions 40 are spaced apart in the circumferential direction relative to one another. Each heel-like portion 40 provides two opposing ends. The connecting portions 38 each extend from one of the ends of one of the heel-like portions 40. The length of the heel-like portions 40 is greater than the diameter of the balls 7.

The second discontinuous ring 36 consists of a second group of heel-like portions 48 (FIG. 1) spaced apart from one another in the circumferential direction. Each heel-like portion 48 provides two opposing ends. Each connecting portion 38 connects one of the ends of one of the heel-like portions 48 to the end of the heel-like portion 40 which is axially opposite.

Each of the heel-like portions 40 of the first group delimits, with the two connecting portions 38 which extend from its ends, a space 50, a ball 7 being arranged therein. Thus, each space 50 of the cage 24 is respectively delimited by a heel-like portion 40 and the two connecting portions 38 which are adjacent thereto. Each of the heel-like portions 48 of the second group delimits, with the two connecting portions 38 which extend from its ends, a space (not referenced) which is able, for example, to be filled with lubricant to reduce the friction of the cage 24 against the races 4 and 6 of the bearing. In the exemplary embodiment illustrated, the wire 32 is produced in a single piece. It is possible without departing from the scope of the invention to conceive of a wire consisting of several pieces assembled together.

The inserts 34 of the cage are shaped so as to be fixed to the wire 32 by hooking, as will be described in more detail below. In the exemplary embodiment illustrated, the cage 24 provides a plurality of pairs of inserts 34 each associated with one of the balls 7. The inserts 34 may be produced in a polymer material or a metal material.

Two inserts 34 are arranged inside each space 50 delimited by the wire 32 of the cage. In the exemplary embodiment illustrated, the inserts 34 are identical to one another. Alternatively, the inserts 34 of each pair mounted inside the space 50 could have a different design from one another. In a further variant, a single insert could be provided inside each space 50.

Each insert 34 provides a body 52 in contact with the associated ball 7. The body 52 provides a concave inner surface following the spherical shape of the ball 7. Conversely, the body 52 provides a convex outer surface. The body 52 of each insert 34 is wholly located inside the associated space 50. In other words, the body 52 is entirely located in the circumferential direction between the two connecting portions 38 delimiting the space 50. Moreover, the body 52 is entirely located on a single side of the heel-like portion 40 delimiting the space 50.

Each insert 34 also provides means for hooking onto the wire 32 of the cage. For each insert 34, the means for hooking provide a first rib 54 and a second rib 56 extending from the outer surface of the body 52. More particularly, the rib 54 extends circumferentially. The rib 56 extends axially. Each rib 54, 56 provides a groove 58, 60 at its free end. For each insert 34 the groove 58 of the rib 54 is provided for the passage and for the retention of a connecting portion 38 delimiting the associated space 50. The groove 60 is provided for the passage and retention of the heel-like portion 40 delimiting the associated space 50. A fixed assembly consisting of a first insert 34, the ball 7 and a second insert 34 is fixed to the wire 32 and held immobile inside the associated space 50.

The seals 26, 28 are axially located on either side of the row of balls 7 inside the bearing space delimited by the races 4, 6. As the seals 26, 28 are in this case identical to one another, only one thereof will be described.

As illustrated in FIG. 3, the seal 26 provides an insert 70 and a gasket 72 arranged on the insert and exerting dynamic sealing with the outer 4 and inner 6 races. "Dynamic sealing" is understood as a seal between two parts having a relative movement.

The insert 70 is produced in a rigid material, for example by the stamping, cutting and folding of a steel sheet.

Alternatively, the insert 70 may be produced in a rigid synthetic material, for example in polyamide. The insert 70 of generally annular shape extends radially. The gasket 72 is produced in a flexible material, for example in elastomer such as rubber or nitrile rubber. The gasket 72 is overmolded or vulcanized on the flange 70.

The gasket 72 provides an annular radial internal heel-like portion 74 and an annular radial external heel-like portion 76 surrounding the heel-like portion 74. The gasket 72 further provides an annular internal sealing lip 78 protruding from the heel-like portion 74 and an annular external sealing lip 80 protruding from the heel-like portion 76, the lips axially extending to the inside of the bearing. The heel-like portions 74 and 76 respectively cover the edges of small and large diameter of the insert 70. The lips 78, 80 fulfill a function of dynamic sealing, respectively with the inner 6 and outer 4 races.

In the exemplary embodiment illustrated, the seal 26 further provides two separate additional lips (not referenced) axially extending to the outside of the bearing. These lips serve, in particular, for limiting the number of external particles reaching the lips 78, 80. It is possible without departing from the scope of the invention to conceive of modifying the arrangement of the internal and external sealing lips.

The insert 70 of the seal provides a radial annular portion 82 and a plurality of means for hooking 84 extending from the radial portion for fixing onto the cage 24. The edges of small and large diameter of the radial portion 82 are respectively covered by the heel-like portions 74 and 76 of the gasket. The means for hooking 84 extend from an inner front surface of the radial portion 82 which is axially oriented on the side of the balls 7. The means for hooking 84 axially extend toward the inside in the direction of the cage 24.

The means for hooking 84 are distributed in the circumferential direction so as to be fixed to each of the heel-like portions 40 of the first group. Alternatively, the insert 70 may provide a different number of means for hooking 84, the number equally being greater than or less than the number of heel-like portions 40 of the first group.

Each means for hooking 84 of the seal provides two tabs or tongues 86, 88 axially extending and radially spaced apart relative to one another. The tongues 86, 88 extend from the inner front surface of the radial portion 82.

A space or notch 90 is delimited between the tongues 86, 88 of each means for hooking to receive and to retain a heel-like portion 40 of the wire 32. The notch 90 is axially open on the inside of the bearing, i.e. on the side of the cage 24. The tongues 86, 88 are dimensioned so as to receive inside the notch 90 a heel-like portion 40 of the cage and to retain the heel-like portion axially. More specifically, the tongues 86, 88 are configured to permit the axial retention of the seal 26 on the cage 24 in two predetermined axial positions.

As illustrated more clearly in FIG. 5, each tongue 86, 88 provides a first protuberance 92, 94 and a second protuberance 96, 98 axially offset to the outside. The protuberances 92 to 98 protrude radially inside the notch 90. The first protuberances 92, 94 and the second protuberances 96, 98 are respectively radially opposite one another. In the exemplary embodiment illustrated, the protuberance 92, 94 is located at the free end of the corresponding tongue.

The protuberance 92 of the tongue 86 extends in the direction of the protuberance 94 of the tongue 88 to ensure the axial retention of the seal 26 by clipping to the cage 24. Similarly, the protuberance 96 of the tongue 86 extends in the direction of the protuberance 98 of the tongue 88 so as to be able to provide in addition the axial retention of the seal 26 by clipping. To this end, for each pair of protuberances 92, 94 and 96, 98, the free ends of the two protuberances radially opposite are spaced apart at a distance less than the diameter of the heel-like portion 40 of the cage so as to provide the axial retention of the seal 26 by clipping to the cage 24.

A first axial hooking position of the seal 26 on the cage is delimited axially by the pair of protuberances 92, 94 and the pair of protuberances 96, 98. In this position illustrated in FIG. 5, the heel-like portion 40 of the cage 32 is located axially between the pairs. A second axial hooking position of the seal 26 is delimited axially by the pair of protuberances 96, 98 and the base of the notch 90 and designed to receive the heel-like portion 40 of the cage 32.

With reference now to FIG. 3, in the first hooking position of the seal 26 on the cage, the lips 78, 80 of the seal respectively come into contact by friction with the grooves 100, 102 of the inner 6 and outer 4 races. The frictional contact between the lips 78, 80 and these grooves is axial. The groove 100 is formed on the outer surface of the inner race 6 and the groove 102 is formed in the bore of the outer race 4, the grooves being radially opposite one another.

In the first hooking position of the seal 26, the seal is axially mounted so as to bear against the outer 4 and inner 6 races according to a first axial interference value which corresponds to a first level of effectiveness of the seal.

In the second hooking position of the seal 26 on the cage which is illustrated in FIG. 4, the seal is axially mounted so as to bear against the races 4, 6 according to a second axial interference value which is greater than the first. In this position, the effectiveness of the seal 26 is increased. The frictional torque between the seal 26 and the races 4, 6 is also increased.

The passage from the first hooking position of the seal 26 to the second hooking position is carried out by simply pushing in an axial direction onto the seal. The means for hooking 84 are configured to permit the passage from one hooking position to the other hooking position by axial sliding of the seal 26 along the cage 24. To this end, the tongues 86 and 88 of each means for hooking are dimensioned so as to be flexible at least radially during the introduction of a heel-like portion 40 of the cage into the notch 90.

In the exemplary embodiment illustrated, the seal 26 is entirely housed inside the bearing space in the different hooking positions on the cage 24. The seal 26 does not protrude axially relative to the front surfaces 12, 20 of the inner and outer races. The seal 28 (FIGS. 1 and 2) is fixed identically on the heel-like portions 48 of the wire of the cage and also cooperates with grooves formed on the outer surface of the inner race and on the bore of the inner race.

In the exemplary embodiment illustrated, the means for hooking 84 of each seal are configured to provide a retention on the cage in two predetermined axial positions relative to the outer and inner races. Alternatively, it might be possible to provide means for hooking which permit a retention on the cage in at least three predetermined axial positions.

In the exemplary embodiment illustrated, for each hooking position of the seal 26, 28 on the cage 24, the seal is in frictional contact with the races. In a variant, for at least one of the hooking positions, it could be possible to provide a cooperation of the seal with each of the races so as to delimit a labyrinth seal.

In the exemplary embodiment illustrated, the means for hooking 84 of each seal cooperate with one of the heel-like portions of the wire of the cage. In one variant, the means for hooking could cooperate with a further part of the wire of the cage or even with an insert of the cage.

In the exemplary embodiment illustrated, the sealing lips of each seal extend from the heel of the gasket. In one variant, these lips could extend directly from the insert, by being for example overmolded on the insert.

In the exemplary embodiment illustrated, each seal 26, 28 provides two parts, namely a reinforcing insert and a gasket fixed to this insert, the insert comprising the means for hooking the seal onto the cage. Alternatively, it could be possible to provide a seal in which the gasket provides the means for hooking. In a further variant, the seal could provide a single part, namely the insert or the gasket, comprising the means for hooking.

In the exemplary embodiment illustrated, each of the balls 7 is arranged in a space 50 delimited by a heel-like portion 40 of the first group and the two associated connecting portions 38. In one variant, it might be possible to provide heel-like portions 48 of the second group having a circumferential direction which is greater, for example substantially equal, to that of the heel-like portions 40 of the first group. Thus the spaces delimited by the heel-like portions 48 of the second group and by the two associated connecting portions 38 are also capable of receiving the balls 7.

The invention has been illustrated on the basis of a bearing provided with a row of balls. In one variant, the cage of the bearing could be designed to provide the circumferential spacing of other types of rolling elements, for example rollers.

The invention claimed is:

1. A bearing comprising:
   an inner race,
   an outer race,
   at least one row of rolling elements, and
   at least one cage for spacing apart the row of rolling elements,
   at least one seal comprising means for hooking configured to permit the retention of the seal on the cage in at least two predetermined axial hooking positions relative to the outer and inner races.

2. The bearing as claimed in claim 1, wherein the means for hooking the seal are configured to permit the passage from a first one of the at least two predetermined axial hooking positions to a second one of the at least two axial hooking positions by the axial sliding of the seal on the cage.

3. The bearing as claimed in claim 1, wherein each means for hooking of the seal comprises a notch that is open axially at the side of the cage, and two first protuberances and two second protuberances radially extending inside the notch to ensure the retention of the seal in the two predetermined axial hooking positions.

4. The bearing as claimed in claim 1, wherein each means for hooking further comprises:
   a notch that is open axially at the side of the cage;
   two flexible tongues delimiting the notch, one flexible tongue of the two flexible tongues having a first protuberance and a second protuberance and a second flexible tongue of the two flexible tongues having a first protuberance and a second protuberance, the first protuberance of the one flexible tongue, respectively, opposite the first protuberance of the second flexible tongue and the second protuberance of the one flexible tongue, respectively, opposite the second protuberance of the second flexible tongue.

5. The bearing as claimed in claim 1, wherein the means for hooking the seal ensures the retention of the seal on a wire of the cage.

6. The bearing as claimed in claim 1, wherein the seal is entirely housed inside a bearing space delimited by the outer and inner races in the predetermined axial hooking positions.

7. The bearing as claimed in claim 1, wherein the inner race comprises at least one groove formed on an outer surface of the race and the outer race includes at least one groove formed in a bore of the race, the seal providing at least one external sealing lip and at least one internal sealing lip respectively cooperating with the grooves of the outer race and the inner race.

8. The bearing as claimed in claim 7, wherein the external and internal sealing lips are axially mounted and bear against the grooves of the inner and outer races in the predetermined axial hooking positions.

9. The bearing as claimed in claim 7, wherein the seal comprises an insert produced of steel or a synthetic material containing polyamide and a gasket produced of one of an elastomer, a rubber, a nitrile rubber, a volcanized material or an overmolded material, the insert providing the means for hooking.

10. The bearing as claimed in claim 1, wherein the cage comprises a wire provided with a first group of heel portions spaced apart from one another in the circumferential direction and forming a first discontinuous ring, a second group of heel portions spaced apart from one another in the circumferential direction and forming a second discontinuous ring and a plurality of connecting portions each extending between one of the heel portions of the first group and one of the heel portions of the second group, the connecting portions and at least one of the heel portions of the first group and at least one of the heel portions of the second group delimiting a plurality of spaces, each comprising a rolling element, the cage further comprising at least one insert arranged inside each space and provided with a body for the housing of the rolling element contained in the space, the body being hooked to at least one of the connecting portions and the heel portion of the wire delimiting the space.

* * * * *